Figure 1:
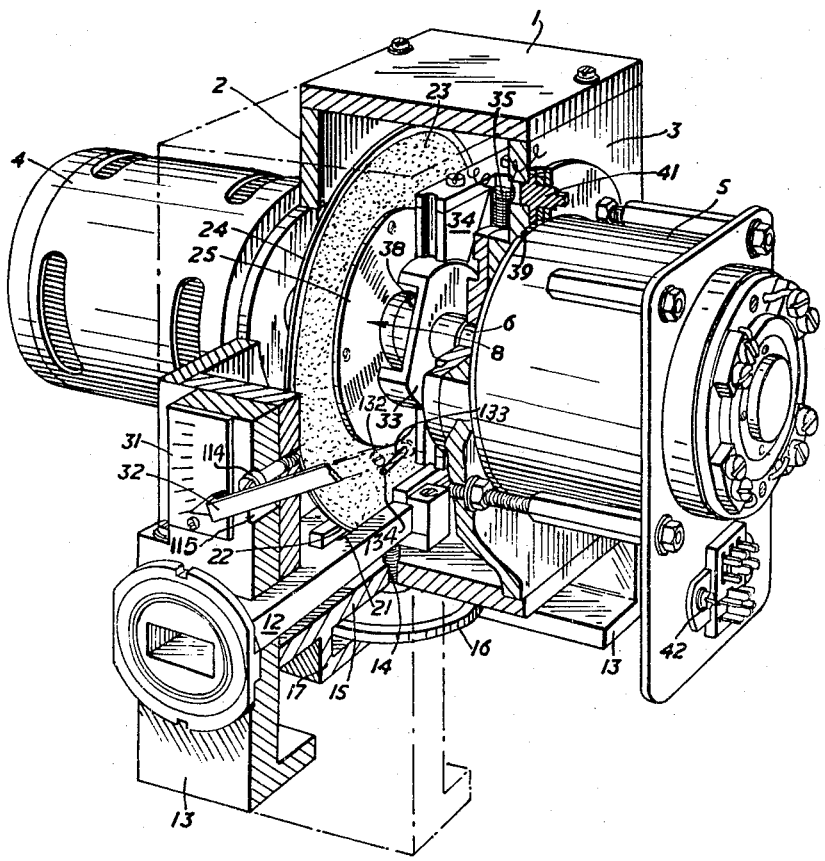

Sept. 8, 1959 G. P. RICHARDS 2,903,658
APPARATUS FOR MODULATING HIGH FREQUENCY WAVES
Filed Jan. 3, 1956 2 Sheets-Sheet 1

INVENTOR
GEOFFREY POWELL RICHARDS

BY Watson, Cole, Grindle &
Watson ATTORNEYS

INVENTOR
GEOFFREY POWELL RICHARDS

United States Patent Office 2,903,658
Patented Sept. 8, 1959

2,903,658

APPARATUS FOR MODULATING HIGH FREQUENCY WAVES

Geoffrey P. Richards, Hayes, England, assignor to The Fairey Aviation Company Limited, Hayes, England, a British company Application January 3, 1956, Serial No. 557,169

Claims priority, application Great Britain January 3, 1955

2 Claims. (Cl. 333—81)

This invention relates to apparatus for modulating a high-frequency electromagnetic wave.

According to the present invention apparatus for modulating a high-frequency electromagnetic wave comprises a wave guide and a probe including a disc of resistive material mounted with a segment of it projecting into the wave guide for rotation to vary periodically the degree of attenuation due to the resistive material of waves travelling along the guide.

Mismatching due to abrupt transitions of impedance along the wave guide is avoided since the depth of the probe tapers gradually from the point of maximum depth along the length of the guide to zero in both directions.

In a preferred form of the invention the disc is circular and is mounted to rotate about an eccentric axis perpendicular to its surface to vary the depth to which it projects into the wave guide periodically.

It may be desirable to avoid even the slightest vibration since the apparatus may be employed in proximity to other apparatus which would be sensitive to such vibration. In any event substantial vibration will generally be undesirable, and accordingly the probe may comprise a non-conductive mounting disc driven to rotate about its centre of gravity, and a thin film of resistive material deposited in the form of an eccentric disc on the non-conductive mounting disc. Since the film has virtually no mass, no mechanical unbalance will thereby be caused. The film may be of Nichrome and may be deposited by vacuum deposition.

Where the probe is constituted by a film deposited eccentrically on a non-conductive disc it will not be possible to vary the eccentricity, and in other instances such variation may be inconvenient. It has however been found that the variation of attenuation with the depth of insertion of the probe is by no means linear and accordingly means may be provided for adjusting the depth of modulation by varying the mean depth to which the probe projects into the wave guide, whilst maintaining constant the variation of depth on either side of the mean value. This provides a particularly convenient method of varying the depth of modulation. On the other hand if the variation of depth on either side of the mean value is small compared with the total depth of the wave, the variation of attenuation with depth over this small range may be regarded as sufficiently nearly linear to avoid distortion.

In this case the mean attenuation will, of course, vary with the depth of modulation, and accordingly it is preferred to provide means for locking the probe in the position of mean depth to enable the unmodulated carrier to be transmitted, and the mean attenuation to be determined. The means for locking the disc in the position of mean depth may comprise an electromagnetic brake polarising the rotor towards one or each position of mean depth.

However, in another form of the invention the plane of the disc is mounted to rotate about an axis oblique to its plane and parallel with one side of the wave guide.

The attenuation produced by a resistive probe is greater the further it is from the side of the guide so that as the disc rotates and the mean distance from the side of the part within the guide, and possibly also the area within the guide, increase and decrease, the attenuation of waves travelling along the guide will vary correspondingly.

Variation of the depth of modulation can be effected by adjusting the angle between the axis of rotation and the plane of the disc, for example by the use of a cylindrical saddle mounted for rotation about an axis at an angle to its own axis, a sleeve adjustably mounted around the saddle and supporting the disc in a plane at an angle to the perpendicular to the axis of the sleeve, and means for securing the sleeve in relation to the saddle.

This form of the invention has the advantage that the disc does not need to be rotated about an eccentric axis and may in consequence be easier to balance.

One or more additional adjustable attenuators may be provided further along the wave guide to enable the variation of attenuation in the position of mean depth to be balanced out, and the total attenuation brought always to a given value. Such an attenuator may be coupled to the means for adjusting the modulation depth so as to effect compensation automatically.

For providing a reference wave an alternator may be provided having its rotor on the same shaft as the disc. The stator is preferably adjustable about its axis to provide relative phase adjustment.

Figure 2:
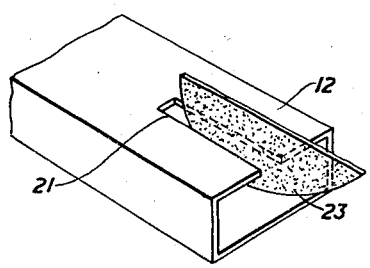
Figure 3:
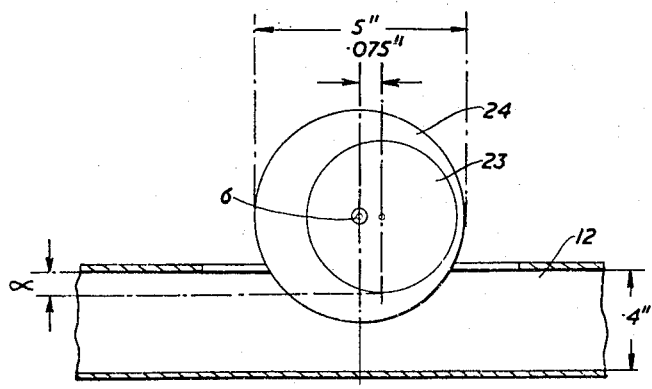
Figure 4:
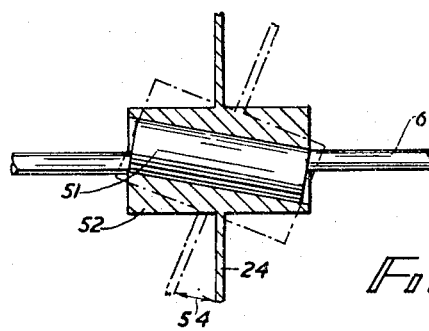

The invention may be carried into practice in various ways but one specific embodiment will be briefly described by way of example with reference to the accompanying drawings of which:

Figure 1 is a perspective view, with parts cut away, of a preferred modulating device embodying the invention, Figure 2 is a sketch of a detail of the device shown in Figure 1, Figure 3 is a sketch used in explaining the operation of the device shown in Figure 1, and Figure 4 is a sketch of a part of a modification of the device shown in Figure 1.

The device comprises a casing 1 of generally rectangular form, two opposite side walls 2 and 3 of which carry respectively a driving motor 4 and an alternator 5 which are mounted outside the casing with their shafts 6 projecting coaxially into it. The shafts are coupled together and one of them carries a rotating disc attenuator assembly 8. The casing 1 is mounted to be capable of vertical adjustment relative to a wave guide 12 supported by feet 13 on a base plate or other suitable surface. For this purpose the wave guide 12 is engaged by an adjusting screw 14 projecting through the bottom 15 of the casing and carrying a large milled adjusting nut 16 which is prevented from moving vertically relative to the casing by the bottom of the casing on the one hand, and a bridge 17 secured beneath it on the other hand. After adjustment the wave guide can be clamped in position by one or more clamping screws 114 passing through a vertical slot 115 in the foot 13 and threaded into the wall of the casing 1. The clamping screws are of course slackened before an adjustment is made by means of the milled nut 16".

The wave guide 12 has in its upper wall a longitudinal slot 21 into which the edge 22 of the attenuating disc 23 can extend as shown in Figure 2. The disc comprises a glass plate 24 clamped to a suitable metal hub 25, and accurately positioned so as to rotate about its centre so as to avoid any vibration. On one face of the glass disc 24 a thin film of Nichrome is formed by vacuum deposition to a resistivity of 200 ohms per square. In the case described the disc is some 5″ in diameter, the spacing of the centre of the film from the centre of the glass disc, and hence from the axis of rotation, being shown greatly exaggerated in Figure 3 and actually being some 75 thousandths of an inch. Hence the total range of movement of the edge of the film, namely 150 thousandths of an inch, is only a small fraction of the depth of the wave guide which, in this case, is 0.40″, its width being 0.90″.

The driving motor 4, which drives the glass disc 24 and the alternator 5, is a two-phase salient pole synchronous motor driven from a push-pull power amplifier (not shown) which derives its input from an accurate 50 cycle per second voltage source. The motor rotates at 3,000 r.p.m. so as to effect modulation at 50 cycles per second.

In operation the guide 12 is excited in the $TE_{01}$ mode by a suitable X-band generator comprising for example a klystron, and the attenuator disc 23 is rotated by means of its driving motor 4 at the required modulation frequency. In these circumstances it is found that the attenuation in decibels varies roughly as the square of the depth $d$ (Figure 3) to which the disc projects into the wave guide. Accordingly the attenuation produced by a given change of depth, corresponding to the eccentricity of the film, is much greater when the disc and wave guide are adjusted so that the former nearly touches the bottom of the latter than when they are adjusted so that the depth of insertion is very small, and hence by varying the position of the wave guide in relation to the disc, the depth of modulation can be varied. In practice a range of modulation depth from about 30% or less up to 90% or more can be obtained. As indicated in Figure 1 a pointer 32 is pivoted to the foot by a screw 132 and has in its end beyond the pivot a slot 133 to receive a pin 134 projecting from the casing 1. Hence the reading of the pointer on a scale 31 indicates the level of the casing relatively to the foot and hence the level of the disc 33 relatively to the wave guide 12. The scale is experimentally calibrated in terms of modulation depth.

Since the variation of modulation depth is accompanied by a variation of the mean depth of insertion of the disc into the wave guide, the mean attenuation or insertion loss and hence the carrier level will also be affected. To enable this to be measured, and if necessary allowed for, or compensated for, means is provided for bringing the disc 23 to rest in one or other of its two positions of mean depth (shown in Figure 3). Since a mechanical brake might be liable to shatter the glass disc 24, an electromagnetic device is provided for this purpose. This comprises a mild steel two-pole rotor 33 mounted coaxially with the glass disc assembly on the alternator shaft 6 and surrounded by a two-pole stator assembly 34 on which two energising coils 35 are wound. When the motor 4 is switched off a direct current is passed through the energising coils 35 so that when the rotor 33 ultimately comes to rest it will be attracted into one or other of the two positions of mean depth of insertion into the wave guide 12. Since these two positions are diametrically opposite, the ambiguity of an unpolarised two-pole magnetic assembly is avoided. An adjustable attenuator (not shown) of any suitable sort further down the wave guide can be employed to restore the carrier level to a given value at each depth of modulation, and may be calibrated for this purpose or even coupled with the adjustment of the attenuator disc 23 so as automatically to maintain constant the carrier level.

A reference wave is produced by the alternator 5, which is a permanent magnet alternator with its rotor mounted on the same shaft 6 as the disc 23. Means are provided for setting the angular relationship between the alternator stator windings, and the casing 1 containing the wave guide 12 to enable the relative phase of the reference wave and the modulator to be accurately adjusted. For purposes of coarse adjustment the disc assembly 8 may be clamped by means of a grubscrew 38 to the alternator shaft 6 so that it can be turned relatively to it to bring the relative phase within say 20° of the correct position, the alternator stator being mounted so as to be capable of adjustment by a toothed quadrant 39 and pinion 41 through a range of some 40° for fine adjustment. After such adjustment the alternator-stator may be firmly clamped in position. Thereafter phase displacements corresponding to 0°, 90°, 180° and 270° may be obtained by means of a selector switch 42 bringing into operation one or other of suitable windings of the alternator.

The apparatus may be modified as shown in Figure 4 so that the shaft 6 is formed with a central cylindrical saddle 51 with its axis at a small angle, say 10°, to the axis of the shaft 6. A cylindrical sleeve 52 with the axis of its bore at an angle to the axis of its outer surface equal to that between the axes of the saddle 51 and the shaft 6, is rotatably mounted on the saddle 51 and supports the disc 24 in a plane perpendicular to the axis of its outer surface. The resistive disc may either be deposited on a glass disc or may constitute the whole of the disc 24, and is concentric with the axis of the outer surface of the sleeve 52. By rotating the sleeve 52 about the saddle 51, the angle between the disc 24 and the axis of the shaft 6 can be varied as shown at 54 in Figure 4. In practice a maximum deviation of two or three degrees from the perpendicular would suffice, so that the slot 21 in the wave guide would have to be widened but not to an excessive extent. The elements can be designed so that the mass centre is always on the axis of the shaft 6.

As the shaft 6 rotates, waves travelling along the wave guide will be attenuated by the resistive disc and this attenuation varies with the distance of the disc from the centre of the guide, being greatest when the disc is in the centre. Due to the angle between the plane of the disc 24 and the axis of the shaft 6, the mean position of the disc from the centre of the guide will vary throughout its cycle, either from one side to the other through the mid position, or from the mid position to one side and back again, according to the position of the disc in the width of the wave guide. The mean depth of the modulation depends upon the angle of the disc, and its position in the width of the wave guide. The disc can be relatively movable in a direction perpendicular to the long sides of the wave guide in the same manner as described with reference to Figure 1 to adjust the mean depth of modulation for a given angle of the disc and other parts of the apparatus can be similar to parts shown in Figure 1.

The modulation is obtained without having the resistive disc eccentrically mounted in relation to the shaft 6 so that difficulties due to rotation of unbalanced masses may not be encountered and that the disc need not be in the form of a deposited film unless a film is preferred.

What I claim as my invention and desire to secure by Letters Patent is:

1. Apparatus for modulating a high frequency electromagnetic wave comprising a wave guide, and a probe including a disc of resistive material mounted with a segment of it projecting into the wave guide for rotation to vary periodically the degree of attenuation due to the resistive material of waves travelling along the guide, including braking means arranged to bring the disc to rest in at least one predetermined position of rotation at which the disc has a mean depth of projection into the wave guide.

2. Apparatus for modulating a high frequency electromagnetic wave comprising a wave guide, and a probe including a disc of resistive material mounted with a segment of it projecting into the wave guide for rotation about an eccentric axis perpendicular to its surface to vary the depth to which it projects into the wave guide periodically and hence to vary periodically the degree of attenuation due to the resistive material of waves travelling along the guide, including locking means comprising an electromagnetic brake having a rotor secured in relation to the disc and means for polarising one of the rotors and stators relatively to the other in a position of mean depth when the disc is not being rotated to lock the disc in its position of rotation for mean attenuation of the waves.

References Cited in the file of this patent

UNITED STATES PATENTS

| | | |
|---|---|---|
| 2,505,557 | Lyman | Apr. 25, 1950 |
| 2,619,538 | Grant | Nov. 25, 1952 |
| 2,660,713 | Alter | Nov. 24, 1953 |